US012413420B2

(12) United States Patent
Ledworowski

(10) Patent No.: US 12,413,420 B2
(45) Date of Patent: Sep. 9, 2025

(54) DISTRIBUTED ATTESTATION IN HETEROGENOUS COMPUTING CLUSTERS

(71) Applicant: Intel Corporation, Santa Clara, CA (US)

(72) Inventor: Jakub Ledworowski, Gdansk (PL)

(73) Assignee: INTEL CORPORATION, Santa Clara, CA (US)

( * ) Notice: Subject to any disclaimer, the term of this patent is extended or adjusted under 35 U.S.C. 154(b) by 150 days.

(21) Appl. No.: 17/551,638

(22) Filed: Dec. 15, 2021

(65) Prior Publication Data

US 2022/0109581 A1  Apr. 7, 2022

(51) Int. Cl.
*H04L 9/32* (2006.01)
*H04L 9/30* (2006.01)
*H04L 9/40* (2022.01)
*H04L 9/00* (2022.01)

(52) U.S. Cl.
CPC .............. *H04L 9/3265* (2013.01); *H04L 9/30* (2013.01); *H04L 63/0428* (2013.01); *H04L 9/50* (2022.05)

(58) Field of Classification Search
CPC ..... H04L 9/3265; H04L 9/30; H04L 63/0428; H04L 9/50
See application file for complete search history.

(56) References Cited

U.S. PATENT DOCUMENTS

| | | | | |
|---|---|---|---|---|
| 8,687,520 B2 * | 4/2014 | Van Wageningen | .... | H04L 12/43 370/254 |
| 8,798,091 B2 * | 8/2014 | Black | ...................... | H04J 3/245 370/461 |
| 8,848,727 B2 * | 9/2014 | Saraiya | ................... | H04L 49/70 370/428 |
| 9,020,347 B2 * | 4/2015 | Koka | ..................... | H04Q 11/00 398/45 |
| 9,571,125 B2 * | 2/2017 | Lee | ......................... | G06F 13/28 |
| 9,792,059 B2 * | 10/2017 | Fuente | .................... | G06F 3/067 |
| 10,338,957 B2 | 7/2019 | Scarlata | | |
| 10,462,153 B2 * | 10/2019 | Stöcker | ................ | H04L 7/0079 |

(Continued)

FOREIGN PATENT DOCUMENTS

CN  116263832 A  6/2023
EP  4198780 A1  6/2023

OTHER PUBLICATIONS

European Search Report for EP Application No. 22 20 1503, mailed Apr. 27, 2023, 2 pgs.

*Primary Examiner* — Michael W Chao
(74) *Attorney, Agent, or Firm* — JAFFERY WATSON HAMILTON & DESANCTIS LLP

(57) ABSTRACT

A method comprises receiving, from a first processing node of a distributed processing cluster, an indication of an attestation result and supporting data for a second processing node of the distributed processing cluster, transmitting the indication of attestation result and supporting data for the second processing node of the distributed processing cluster to at least one additional processing node of the processing cluster, and in response to a determination that the indication of an attestation result for the second processing node of the distributed processing cluster indicated that the second processing node of the distributed processing device is secure, establishing a secure communication connection with the second processing node of the distributed processing cluster using the supporting data.

12 Claims, 6 Drawing Sheets

(56) References Cited

U.S. PATENT DOCUMENTS

| | | | | |
|---|---|---|---|---|
| 10,547,497 | B1* | 1/2020 | Mostafa | H04L 12/1403 |
| 10,728,272 | B1* | 7/2020 | Ranjha | G06F 16/9024 |
| 10,761,913 | B2* | 9/2020 | McClory | G06F 11/3684 |
| 11,190,983 | B2* | 11/2021 | Gapin | H04W 28/22 |
| 11,240,301 | B2* | 2/2022 | Kaddoura | A61F 2/447 |
| 11,303,616 | B2* | 4/2022 | Kumar | H04L 63/0428 |
| 11,399,013 | B2* | 7/2022 | Bandi | G06F 21/53 |
| 11,424,939 | B1* | 8/2022 | Allen | H04L 9/3234 |
| 11,463,256 | B2* | 10/2022 | Clark | H04L 9/3213 |
| 11,470,065 | B2* | 10/2022 | McCallum | H04L 67/1051 |
| 11,558,423 | B2* | 1/2023 | Gordon | H04L 63/0245 |
| 11,627,128 | B2* | 4/2023 | Simon | H04L 63/0876 726/4 |
| 11,720,913 | B2* | 8/2023 | Augustine | G06Q 20/3672 705/66 |
| 11,860,995 | B2* | 1/2024 | Shannon | G06F 21/57 |
| 11,886,938 | B2* | 1/2024 | Goel | H04L 47/50 |
| 11,899,629 | B2* | 2/2024 | Reinsberg | G06F 16/1834 |
| 11,934,164 | B2* | 3/2024 | Hultqvist | G06F 21/88 |
| 11,963,006 | B2* | 4/2024 | Avetisov | H04L 63/20 |
| 11,968,313 | B2* | 4/2024 | Attard | G06Q 10/10 |
| 11,973,750 | B2* | 4/2024 | Simic | H04L 9/3218 |
| 12,212,568 | B1* | 1/2025 | Chandrashekar | H04L 63/10 |
| 2012/0173868 | A1* | 7/2012 | Isaacs | G06F 16/957 713/150 |
| 2012/0216244 | A1* | 8/2012 | Kumar | G06F 21/31 726/1 |
| 2017/0063554 | A1* | 3/2017 | An | H04L 9/3247 |
| 2017/0244565 | A1 | 8/2017 | Bronk | |
| 2017/0317997 | A1* | 11/2017 | Smith | H04L 9/3247 |
| 2018/0181756 | A1* | 6/2018 | Campagna | H04L 9/088 |
| 2019/0065406 | A1* | 2/2019 | Steiner | H04L 9/3271 |
| 2019/0109866 | A1* | 4/2019 | Lokamathe | H04L 9/3247 |
| 2019/0243963 | A1 | 8/2019 | Soriente | |
| 2020/0311312 | A1* | 10/2020 | Yu | H04L 9/0897 |
| 2020/0313902 | A1* | 10/2020 | Yu | G06F 21/6218 |
| 2021/0011984 | A1 | 1/2021 | Renke et al. | |
| 2021/0037042 | A1* | 2/2021 | Fu | G06F 21/44 |
| 2021/0349882 | A1* | 11/2021 | Basak | G06F 16/211 |
| 2021/0350010 | A1* | 11/2021 | Schvey | G06Q 20/223 |
| 2022/0043914 | A1* | 2/2022 | Edwards | H04L 9/0816 |
| 2022/0078015 | A1* | 3/2022 | Nainar | H04L 9/3213 |
| 2022/0094690 | A1* | 3/2022 | Tarkhanyan | G06F 9/505 |
| 2022/0139511 | A1* | 5/2022 | Osborn | H04L 63/0823 705/2 |
| 2022/0247576 | A1* | 8/2022 | Beekman | H04L 9/3263 |
| 2023/0054245 | A1* | 2/2023 | Wright | H04L 9/3297 |
| 2023/0065060 | A1* | 3/2023 | Kumar | H04L 9/0838 |
| 2023/0206220 | A1* | 6/2023 | Maim | G06Q 20/389 705/67 |
| 2023/0289478 | A1* | 9/2023 | Schiffman | G06F 21/57 |
| 2023/0388277 | A1* | 11/2023 | Crabtree | H04L 9/3236 |
| 2024/0062195 | A1* | 2/2024 | Mu | G06Q 20/389 |

\* cited by examiner

DISTRIBUTED ATTESTATION IN HETEROGENOUS COMPUTING CLUSTERS

BACKGROUND

In a cloud computing system, information is stored, transmitted, and used by many different (i.e., heterogenous) information processing systems. In a heterogenous environment of data and/or computing centers or cloud service providers, hardware (i.e., processing devices) can be organized in clusters of various topologies for optimum performance. Maintenance of a cluster requires periodic verification (i.e., attestation) that every device is running the correct version of hardware, firmware, and software, and that the processing device was not impersonated by a malicious device or emulator. Usually, attestation is done using an attestation service request to a single device. Furthermore, attestation may be an entry point to establish secure communication (i.e., trust) between parties (e.g., ECDH key agreement).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION

Figure 1:
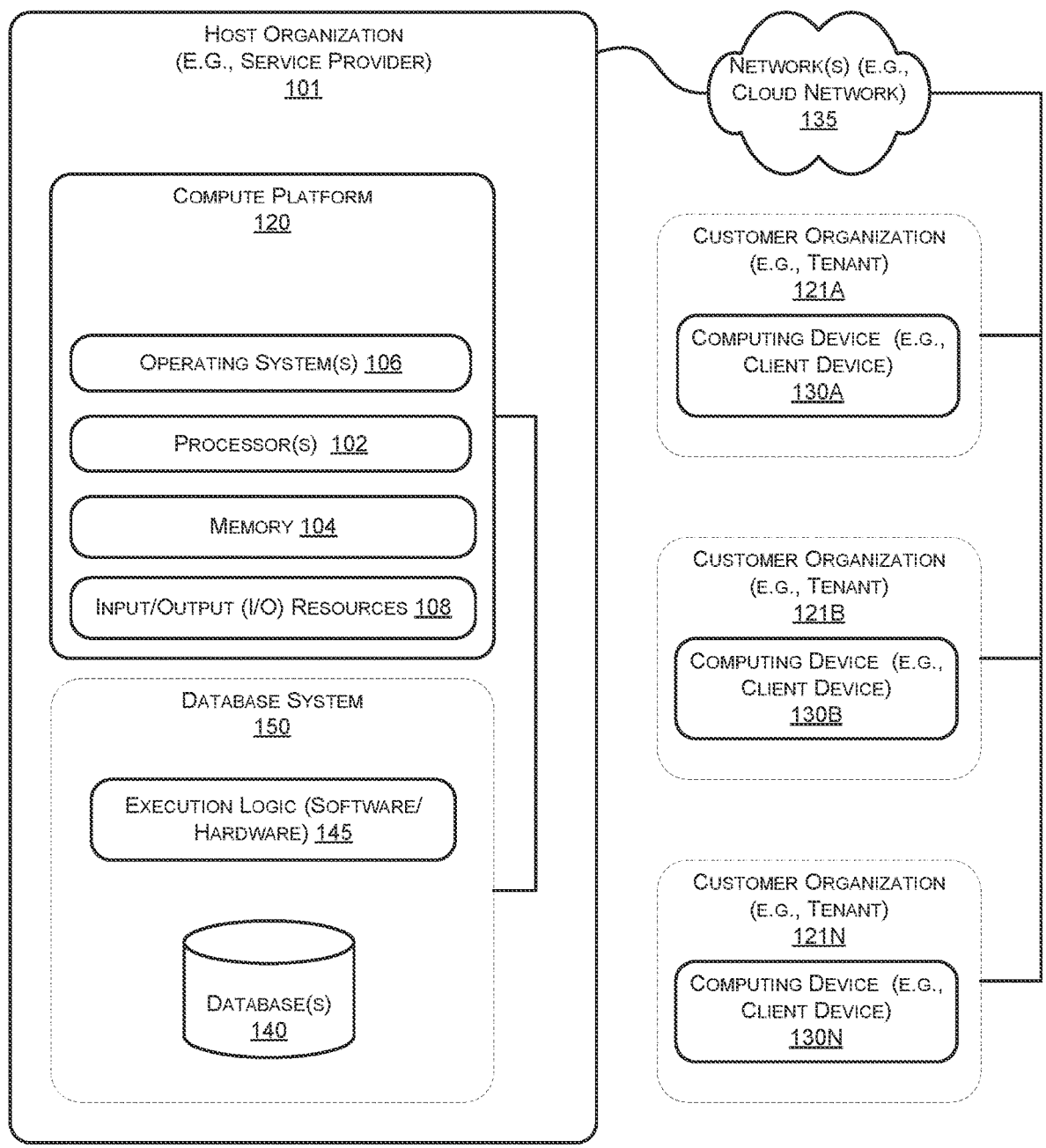
FIG. 1 is a schematic illustration of a processing environment in which distributed attestation in heterogenous computing clusters may be implemented, according to an embodiment.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Example Cloud-Based Computing Environment

FIG. 1 is a schematic illustration of a processing environment in which systems and methods for trusted execution aware hardware debug and manageability may be implemented, according to embodiments. Referring to FIG. 1, a system 100 may comprise a compute platform 120. In one embodiment, compute platform 120 includes one or more host computer servers for providing cloud computing services. Compute platform 120 may include (without limitation) server computers (e.g., cloud server computers, etc.), desktop computers, cluster-based computers, set-top boxes (e.g., Internet-based cable television set-top boxes, etc.), etc. Compute platform 120 includes an operating system ("OS") 106 serving as an interface between one or more hardware/physical resources of compute platform 120 and one or more client devices 130A-130N, etc. Compute platform 120 further includes processor(s) 102, memory 104, input/output ("I/O") sources 108, such as touchscreens, touch panels, touch pads, virtual or regular keyboards, virtual or regular mice, etc.

In one embodiment, host organization 101 may further employ a production environment that is communicably interfaced with client devices 130A-N through host organization 101. Client devices 130A-N may include (without limitation) customer organization-based server computers, desktop computers, laptop computers, mobile compute platforms, such as smartphones, tablet computers, personal digital assistants, e-readers, media Internet devices, smart televisions, television platforms, wearable devices (e.g., glasses, watches, bracelets, smartcards, jewelry, clothing items, etc.), media players, global positioning system-based navigation systems, cable setup boxes, etc.

In one embodiment, the illustrated database system 150 includes database(s) 140 to store (without limitation) information, relational tables, datasets, and underlying database records having tenant and user data therein on behalf of customer organizations 121A-N (e.g., tenants of database system 150 or their affiliated users). In alternative embodiments, a client-server computing architecture may be utilized in place of database system 150, or alternatively, a computing grid, or a pool of work servers, or some combination of hosted computing architectures may be utilized to carry out the computational workload and processing that is expected of host organization 101.

The illustrated database system 150 is shown to include one or more of underlying hardware, software, and logic elements 145 that implement, for example, database functionality and a code execution environment within host organization 101. In accordance with one embodiment, database system 150 further implements databases 140 to service database queries and other data interactions with the databases 140. In one embodiment, hardware, software, and logic elements 145 of database system 150 and its other elements, such as a distributed file store, a query interface, etc., may be separate and distinct from customer organizations (121A-121N) which utilize the services provided by host organization 101 by communicably interfacing with host organization 101 via network(s) 135 (e.g., cloud network, the Internet, etc.). In such a way, host organization 101 may implement on-demand services, on-demand database services, cloud computing services, etc., to subscribing customer organizations 121A-121N.

In some embodiments, host organization 101 receives input and other requests from a plurality of customer organizations 121A-N over one or more networks 135; for example, incoming search queries, database queries, application programming interface ("API") requests, interactions with displayed graphical user interfaces and displays at client devices 130A-N, or other inputs may be received from customer organizations 121A-N to be processed against database system 150 as queries via a query interface and stored at a distributed file store, pursuant to which results are then returned to an originator or requestor, such as a user of client devices 130A-N at any of customer organizations 121A-N.

As aforementioned, in one embodiment, each customer organization 121A-N may include an entity selected from a group consisting of a separate and distinct remote organization, an organizational group within host organization 101, a business partner of host organization 101, a customer organization 121A-N that subscribes to cloud computing services provided by host organization 101, etc.

In one embodiment, requests are received at, or submitted to, a server within host organization 101. Host organization 101 may receive a variety of requests for processing by host organization 101 and its database system 150. For example, incoming requests received at the server may specify which services from host organization 101 are to be provided, such as query requests, search request, status requests, database transactions, graphical user interface requests and interactions, processing requests to retrieve, update, or store data on behalf of one of customer organizations 121A-N, code execution requests, and so forth. Further, the server at host organization 101 may be responsible for receiving requests from various customer organizations 121A-N via network(s) 135 on behalf of the query interface and for providing a web-based interface or other graphical displays to one or more end-user client devices 130A-N or machines originating such data requests.

Further, host organization 101 may implement a request interface via the server or as a stand-alone interface to receive requests packets or other requests from the client devices 130A-N. The request interface may further support the return of response packets or other replies and responses in an outgoing direction from host organization 101 to one or more client devices 130A-N.

It is to be noted that terms like "node", "computing node", "server", "server device", "cloud computer", "cloud server", "cloud server computer", "machine", "host machine", "device", "compute platform", "computer", "computing system", "multi-tenant on-demand data system", and the like, may be used interchangeably throughout this document. It is to be further noted that terms like "code", "software code", "application", "software application", "program", "software program", "package", "software code", "code", and "software package" may be used interchangeably throughout this document. Moreover, terms like "job", "input", "request", and "message" may be used interchangeably throughout this document.

In general, "servers," "devices," "computing devices," "host devices," "user devices," "clients," "servers," "computers," "platform," "environment," "systems," etc. can include electronic computing devices operable to receive, transmit, process, store, or manage data and information associated with the computing environment 100. As used in this document, the term "computer," "computing device," "processor," or "processing device" is intended to encompass any suitable processing device adapted to perform computing tasks consistent with the execution of computer-readable instructions. Further, any, all, or some of the computing devices may be adapted to execute any operating system, including Linux, UNIX, Windows Server, etc., as well as virtual machines adapted to virtualize execution of a particular operating system, including customized and proprietary operating systems. Computing devices may be further equipped with communication modules to facilitate communication with other computing devices over one or more networks. Such networks may include local and wide area networks, wireless and wireline networks, public and private networks, and any other communication network enabling communication between systems.

Figure 2:
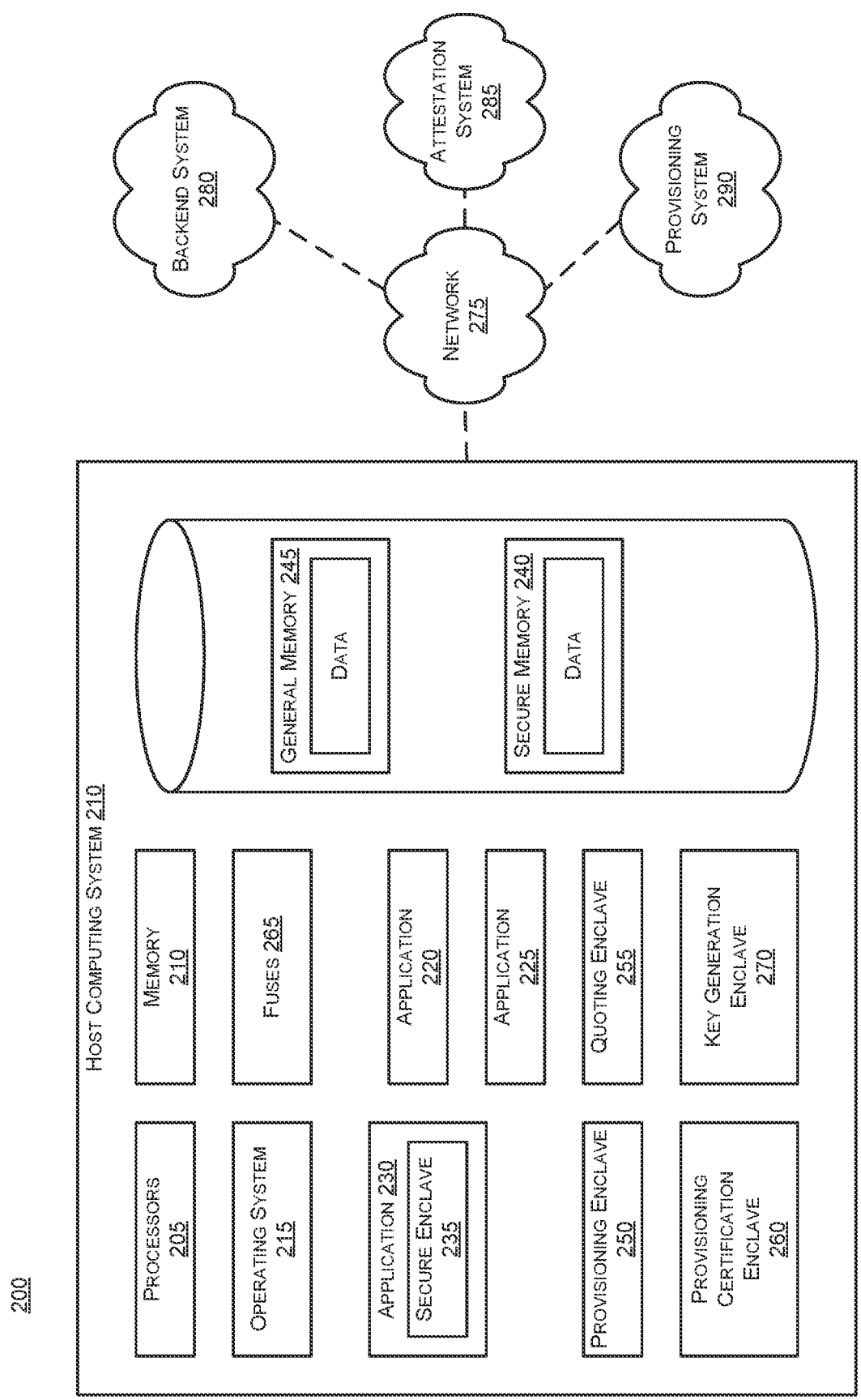
FIG. 2 is a schematic illustration simplified block diagram of a computing environment comprising a host computing system which may be adapted to implement distributed attestation in heterogenous computing clusters according to an embodiment.

FIG. 2 is a schematic illustration simplified block diagram of a computing environment 200 comprising an example host computing system 210 in which distributed attestation in heterogenous computing clusters according to an embodiment. Turning to the example of FIG. 2, a host computing system 210 can include one or more processor devices 205, one or more memory elements 210, and other components implemented in hardware and/or software, including an operating system 215 and one or more applications (e.g., 220, 225, 230) that execute on the operating system 215. One or more of the applications may be secured using a secure enclave 235, or application enclave. Secure enclaves can be implemented in secure memory 240 (as opposed to general memory 245) and utilizing secured processing functionality of at least one of the processors (e.g., 205) of the host system to implement private regions of code and data to provide certain secured or protected functionality of the application.

Host computing system 210 may comprise computing devices implemented as one or more local and/or remote client or end user devices, such as application servers, personal computers, laptops, smartphones, tablet computers, personal digital assistants, media clients, web-enabled televisions, telepresence systems, gaming systems, multimedia servers, set top boxes, smart appliances, in-vehicle computing systems, and other devices adapted to receive, view, compose, send, or otherwise interact with, access, manipulate, consume, or otherwise use applications, programs, and services served or provided through servers within or outside the respective device (or environment 200). A host computing system 210 can include any computing device operable to connect or communicate at least with servers, other host devices, networks, and/or other devices using a wireline or wireless connection. A host computing system 210, in some instances, can further include at least one graphical display device and user interfaces, including touchscreen displays, allowing a user to view and interact with graphical user interfaces of applications, tools, services, and other software of provided in environment 200. It will be understood that there may be any number of host computing systems 210 associated with environment 200, as well as any number of host computing systems 210 external to environment 200. Further, the term "host device," "client," "end user device," "endpoint device," and "user" may be used interchangeably as appropriate without departing from the scope of this disclosure. Moreover, while each end user device may be described in terms of being used by one user, this disclosure contemplates that many users may use one computer or that one user may use multiple computers, among other examples.

In some examples processing logic, implemented in firmware and/or software of the host computing system 210 (such as code of the CPU of the host computing system 210), can be provided on the host computing system 210 that can be utilized by applications or other code local to the host system to set aside private regions of executable code and data, which are subject to guarantees of heightened security, to implement one or more secure enclaves on the host computing system 210. For instance, a secure enclave can be used to protect sensitive data from unauthorized access or modification by rogue software running at higher privilege levels and preserve the confidentiality and integrity of sensitive code and data without disrupting the ability of legitimate system software to schedule and manage the use of platform resources.

Secure enclaves can enable applications to define secure regions of code and data that maintain confidentiality even when an attacker has physical control of the platform and can conduct direct attacks on memory. Secure enclaves can further allow consumers of computing services provided by the host computing system 210 to retain control of their platforms including the freedom to install and uninstall applications and services as they choose. Secure enclaves can also enable a host system platform to measure a corresponding application's trusted code and produce a signed attestation, rooted in the processor, that includes this measurement and other certification that the code has been correctly initialized in a trustable environment (and is capable of providing the security features of a secure enclave, such as outlined in the examples above). Generally, secure enclaves (and other secured enclaves described herein) can adopt or build upon principles described, for instance, in the Intel® Software Guard Extensions Programming Reference, among other example platforms.

In some examples the attestation system 285 can receive data, or "quotes," generated by secured logical components, or enclaves, running on host computing system 210 to attest to the authenticity and security (and other characteristics) of another application or enclave of the host computing system 210 and confirm the attestation based on the received quote. The quote can be signed or include data that has been signed by a cryptographic key, cipher, or other element (collectively referred to herein as "keys") from which the attestation system can authenticate or confirm the trustworthiness of the quote (and thereby also the application or enclave attested to by the quote). Such keys can be referred to as attestation keys. A provisioning system 290 can be utilized to securely provision such attestation keys on the host computing system 210.

In some cases, attestation can be carried out in connection with a client-server or frontend-backend interaction (e.g., over one or more networks 275) between an application hosted on host computing system 210 and a backend service hosted by a remote backend system 280. Sensitive data and transaction can take place in such interactions and the application can attest to its trustworthiness and security to the backend system 280 (and vice versa) using an attestation system (e.g., 285). In some implementations, the attestation system 285 itself can be hosted on the backend system 280. In other cases, a backend system 280 can consume the attestation services of a separate attestation system 285.

In some examples a provisioning system 290 can maintain a database of certificates mapped to various host computing systems 210 equipped with hardware and software to implement trusted execution environments, or secure enclaves. Each of the certificates can be derived from keys that are themselves based on persistently maintained, secure secrets provisioned on the host computing systems 210 during manufacture. The secrets remain secret to the host device and may be implemented as fuses, a code in secure persistent memory, among other implementations. The key may be the secret itself or a key derived from the secret. The certificate may not identify the key and the key may not be derivable from the certificate, however, signatures produced by the key may be identified as originating from a particular one of the host devices for which a certificate is maintained based on the corresponding certificate. In this manner, a host computing system 210 can authenticate to the provisioning system 290 and be provided (by the provisioning system 290) with an attestation key that is securely associated with the host device. These attestation key(s) can then be used by secure enclaves on the corresponding host computing system 210 to attest to one or more applications or enclaves present on the host device.

Networks 275, in some implementations, can include local and wide area networks, wireless and wireline networks, public and private networks, and any other communication network enabling communication between the systems.

An attestation is a signed assertion reflecting information such as 1) what software is running within an enclave; 2) who signed the assertion and the version information; 3) the hardware information and hardware trusted computing base (TCB); and information from the enclave (e.g., trusted key). In embodiments, each platform has a certified attestation key for signing attestations on behalf of the platform.

In some examples, attestation can be provided on the basis of a signed piece of data, or "quote," that is signed using an attestation key securely provisioned on the platform. A developer partitions an application into a portion that requires security and a portion that does not require security.

For example, code that implements a graphic interface that controls video playback doesn't need to be trusted, but code that decrypts and processes a video file does require security. In this example the developer puts the security sensitive portions in the enclave and the untrusted portion remains outside the enclave.

Secured enclaves can sign a measurement (included in a quote) and assist in the provisioning of one or more of the enclaves with keys for use in signing the quote and established secured communication channels between enclaves or between an enclave and a remote device. For example, one or more provisioning enclaves 250 can be provided to interface with a corresponding provisioning system to obtain attestation keys for use by a quoting enclave 255 and/or application enclave. One or more quoting enclaves 255 can be provided to sign a measurement of an application enclave 230 with the attestation key obtained through the corresponding provisioning enclave 250. A provisioning certification enclave 260 may also be provided to authenticate a provisioning enclave (e.g., 250) to its corresponding provisioning system (e.g., 290). The provisioning certification enclave 260 can maintain a provisioning attestation key that is based on a persistently maintained, secure secret on the host platform 110, such as a secret set in fuses 265 of the platform during manufacturing, to support attestation of the trustworthiness of the provisioning enclave 250 to the provisioning system 290, such that the provisioning enclave 250 is authenticated prior to the provisioning system 290 entrusting the provisioning enclave 250 with an attestation key.

In some implementations, the provisioning certification enclave 260 can attest to authenticity and security of any one of potentially multiple provisioning enclaves 250 provided on the host computing system 210. For instance, multiple different provisioning enclaves 250 can be provided, each interfacing with its own respective provisioning system, providing its own respective attestation keys to one of potentially multiple quoting enclaves (e.g., 255) provided on the platform. For instance, different application enclaves can utilize different quoting enclaves during attestation of the corresponding application, and each quoting enclave can utilize a different attestation key to support the attestation. Further, through the use of multiple provisioning enclaves and provisioning services, different key types and encryption technologies can be used in connection with the attestation of different applications and services (e.g., hosted by backend systems 280).

In some implementations, rather than obtaining an attestation key from a remote service (e.g., provisioning system 290), one or more applications and quoting enclaves can utilize keys generated by a key generation enclave 270 provided on the host computing system 210. In other examples a trusted execution environment (TEE) provides an instruction to hardware to generate a persistent key that will be available in future boot operations. The quoting enclave 255 can use this to create a value that can be used to create a signing key and the provisioning certification enclave (PCE) 260 can sign that key. To attest to the reliability of the key provided by the key generation enclave 270, the provisioning certification enclave 260 can sign the key (e.g., the public key of a key pair generated randomly by the key generation enclave) such that quotes signed by the key can be identified as legitimately signed quotes.

Distributed Attestation in Cluster Computing Environment

As described above, in a cloud computing system, information is stored, transmitted, and used by many different (i.e., heterogenous) information processing systems. In a heterogenous environment of data and/or computing centers or cloud service providers, hardware (i.e., processing devices) can be organized in clusters of various topologies for optimum performance. Maintenance of a cluster requires periodic verification (i.e., attestation) that every device is running the correct version of hardware, firmware, and software, and that the processing device was not impersonated by a malicious device or emulator. Usually, attestation is done using an attestation service request to a single device, which can generate significant processing overhead. Further, this arrangement introduces a single point of failure because the attestation service is a root of trust. Finally, trust is established only between the attestation service and a single device.

To address these and other issues, described herein are systems and methods to implement distributed attestation in heterogenous computing clusters. In some examples techniques described herein enable peer-to-peer attestation, such that each processing node in a cluster is able to attest any other processing node in the cluster. In some examples a decentralized protocol (e.g., based on blockchain) may be used as a medium to store and distribute attestation result (e.g., PASS/FAIL). Additional data (e.g., a cryptographic public key) may be included with the attestation result so that the secure communication might be continued from a different device. Once the attestation result is distributed, any device can either reuse (i.e., re-establish trust) or challenge any previous attestation result. Challenge of previous attestation can take different forms depending on the system requirements. Examples include, but are not limited to, removal of the device being challenged from the cluster, repeating the attestation, notifying external service, request to allow list or revocation list, repeating attestation between the same devices, repeating attestation between the challenging device being challenged, requesting other devices to repeat the attestation with the device being challenged, notifying an external service that some action on failed node must happen, etc.

Figure 3:
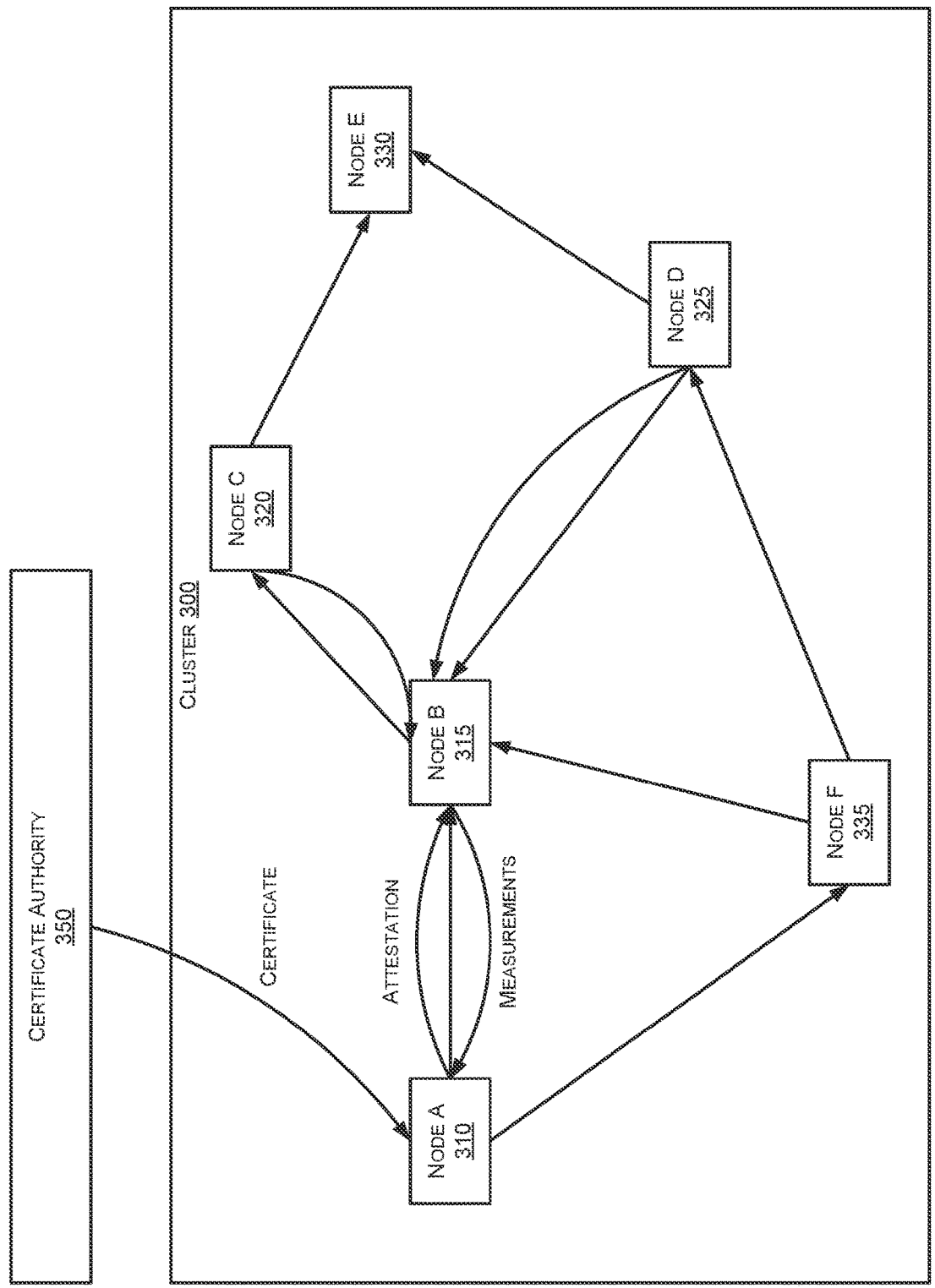
FIG. 3 is a schematic illustration of a computing cluster in which distributed attestation may be implemented according to an embodiment.

FIG. 3 is a schematic illustration of a computing cluster 300 in which distributed attestation may be implemented according to an embodiment. Referring to FIG. 3, in some examples the computing cluster 300 310 comprises a plurality of processing nodes indicated in FIG. 3 as node a 310, node b 315, node c 320, node d 325 node e 330, and node f 335. In various examples the respective processing nodes may comprise one or more of a central processing unit (CPU), a graphics processing unit (GPU), a field gate programmable array (FPGA), or the like. The respective processing nodes may be communicatively coupled via suitable communication busses to form a communication network that enables cooperative processing by the respective nodes. The cluster 300 may be communicatively coupled to a certificate authority 350, e.g., via a suitable communication network. Operations performed by the various processing nodes to implement distributed attestation will be described with reference to FIG. 4 and FIG. 5.

Figure 4:
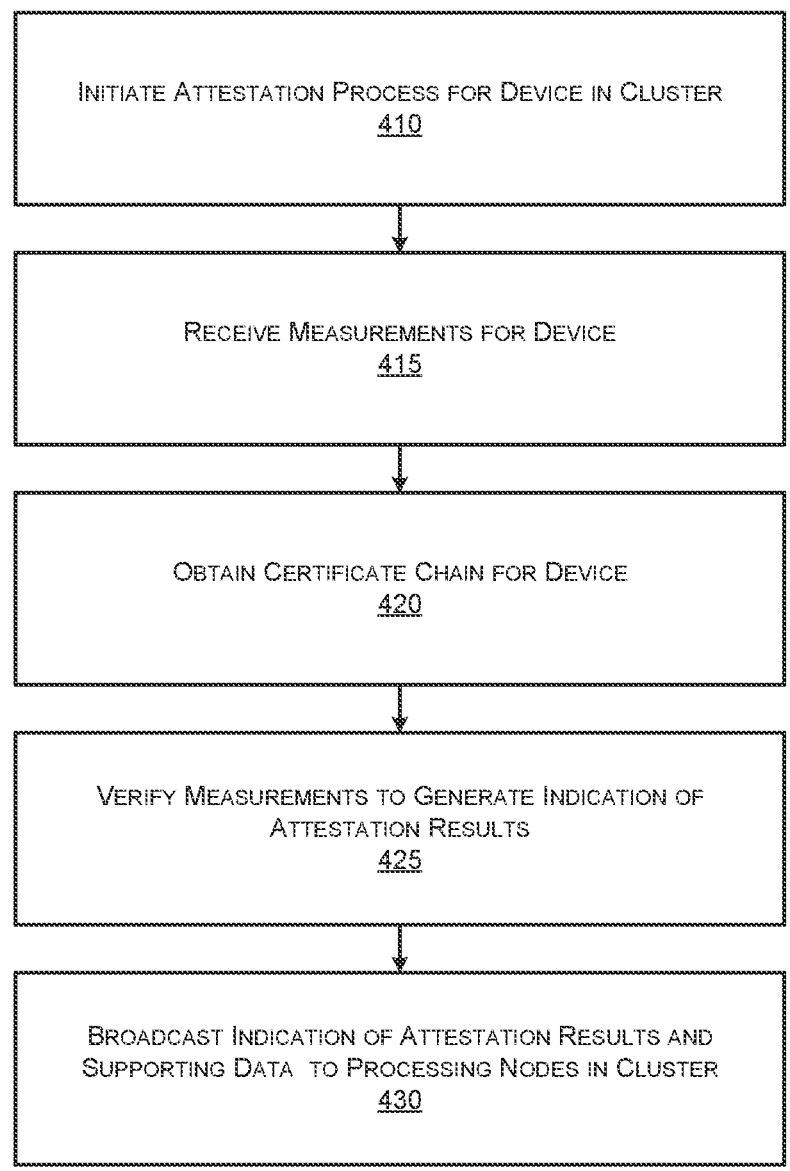
FIG. 4 is a simplified operational flow diagram of at least one embodiment of a method for implementing distributed attestation in heterogenous computing clusters according to an embodiment.

FIG. 4 is a simplified operational flow diagram of at least one embodiment of a method 400 for implementing distributed attestation in heterogenous computing clusters according to an embodiment. In some examples the operations depicted in FIG. 4 enable one of the processing nodes to perform an attestation process on another of the processing nodes and to distribute the result of the attestation process to other nodes in the cluster 300. Referring to FIG. 4, at operation 410 a first processing node of the processing nodes (e.g., node a 310) initiates an attestation process with a second processing node (e.g., node b 315). In response to the attestation request, the second processing node (e.g., node b 315) collects its attestation measurements and returns them to the requesting node (e.g., node a 310).

At operation 415 the requesting node (e.g., node a 310) receives the measurements collected by the second processing node (e.g., node b 315), or a hash thereof. At operation 420 the requesting node (e.g., node a 310) obtains the certificate chain for the second processing node (e.g., node b 315). In some examples the requesting node (e.g., node a 310) requests the certificate chain from the certificate authority 350, which returns the certificate to the requesting node (e.g., node a 310). In some examples the certificate chain comprises the expected measurements (or a hash thereof) for the second processing node (e.g., node b 315). In other examples some portion of the certificate chain may be provided by one or more other entities. For example, the second processing node (e.g., node b 315) may provide measurements, which may be incorporated into the certificate chain.

At operation 425 the requesting node (e.g., node a 310) verifies the measurements received from the second processing node (e.g., node b 315) to generate an indication of the attestation results. In some examples the requesting node (e.g., node a 310) compares the expected measurements for the second processing node (e.g., node b 315) received from the certificate authority 350 to the actual measurements received from the second processing node (e.g., node b 315) to verify the measurements. If the actual measurements match the expected measurements, then the indication of the attestation results is set to indicate that the attestation has passed. By contrast, if the actual measurements do not match the expected measurements, then the indication of the attestation results is set to indicate that the attestation has failed. In some examples the requesting node (e.g., node a 310) receives a hash of the expected measurements from the certificate authority 350 with a hash of the actual measurements for the second processing node (e.g., node b 315) to verify the measurements. If the hash of the actual measurements matches the hash of the expected measurements, then the indication of the attestation results is set to indicate that the attestation has passed. By contrast, if the hash of the actual measurements does not match the hash of the expected measurements, then the indication of the attestation results is set to indicate that the attestation has failed.

At operation 430 the requesting node (e.g., node a 310) broadcasts the indication of the attestation results (e.g., pass/fail) and supporting data to the processing nodes in the cluster 300. In some examples the supporting data may comprise a public cryptographic key (e.g., an ECDH key) for the second processing node (e.g., node b 315). In some examples this information may be broadcasted using a distributed protocol such as, e.g., blockchain or distributed databases.

Figure 5:
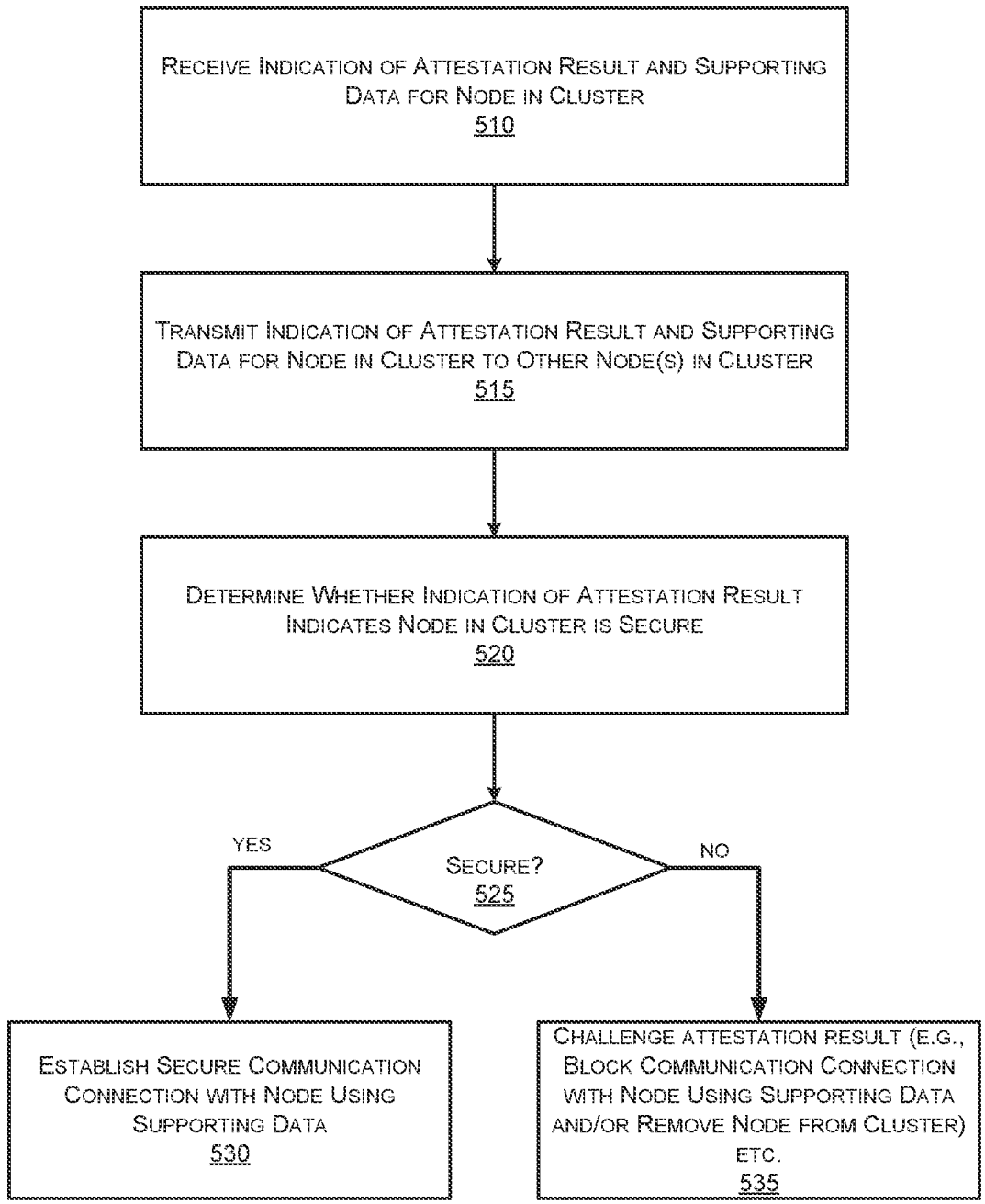
FIG. 5 is a simplified operational flow diagram of at least one embodiment of a method for implementing distributed attestation in heterogenous computing clusters according to an embodiment.

FIG. 5 is a simplified operational flow diagram of at least one embodiment of a method 500 for implementing distributed attestation in heterogenous computing clusters according to an embodiment. In some examples the operations depicted in FIG. 5 enable the processing nodes to propagate the indicator of the attestation results and supporting data to the various nodes throughout the cluster 300 and to establish an efficient process for assessing trust between processing nodes in the cluster 300.

Referring to FIG. 5, at operation 510 a processing node in the cluster 300 receives an indication of the attestation result and the supporting data for the second processing node (e.g., node b 315). At operation 515 the processing node transmits the indication of the attestation result and the supporting data for the second processing node (e.g., node b 315) to one or more adjacent processing nodes in the cluster 300.

At operation 520 the processing node determines whether the indication of the attestation result indicates that the indication of the attestation result and the supporting data for the second processing node (e.g., node b 315) is secure. In some examples the indication of the attestation result and the supporting data for the second processing node (e.g., node b 315) may be considered secure if the indication of the attestation result is set to a value that indicates the second processing node (e.g., node b 315) passed the attestation from the first processing node (e.g., node a 310).

If, at operation 525, the indication of the attestation result indicates that the indication of the attestation result for the second processing node (e.g., node b 315) is secure, then operation 530 is implemented and the processing node establishes a secure communication connection with the indication of the attestation result and the supporting data for the second processing node (e.g., node b 315). By contrast, if at operation 525, the indication of the attestation result indicates that the indication of the attestation result for the second processing node (e.g., node b 315) is not secure, then operation 535 is implemented and the processing node may challenge the attestation result, as described above. In some examples the processing node may block a communication connection with the second processing node (e.g., node b 315). Alternatively, or in addition, the processing node may remove the second processing node (e.g., node b 315) from the cluster 300.

Exemplary Computing Architecture

Figure 6:
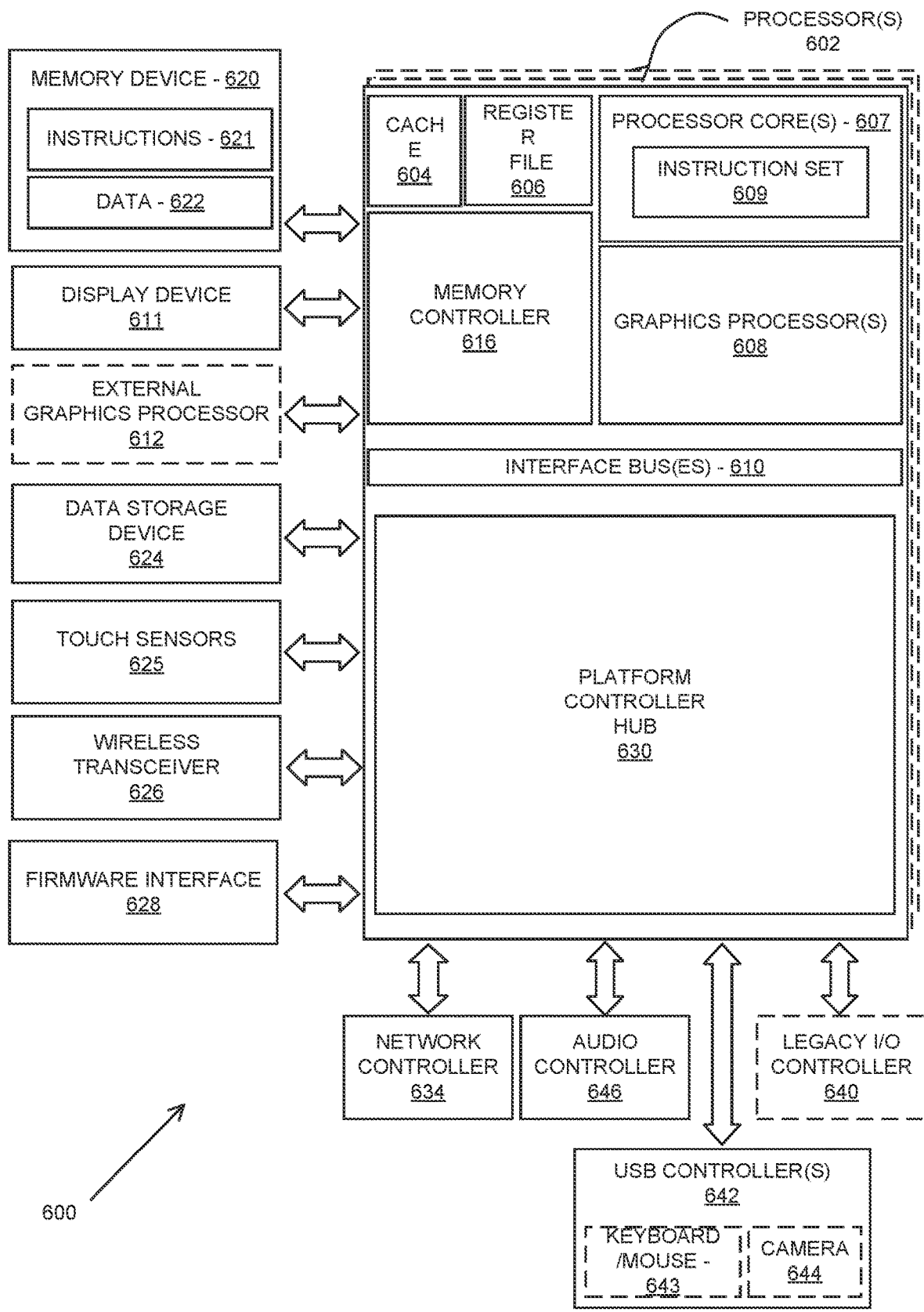
FIG. 6 is a block diagram illustrating a computing architecture which may be adapted to provide a method for implementing distributed attestation in heterogenous computing clusters according to an embodiment.

FIG. 6 is a block diagram illustrating a computing architecture 600 which may be adapted to provide a method for implementing distributed attestation in heterogenous computing clusters according to an embodiment. In various embodiments, the computing architecture 600 may comprise or be implemented as part of an electronic device. In some embodiments, the computing architecture 600 may be representative, for example, of a computer system that implements one or more components of the operating environments described above. In some embodiments, computing architecture 600 may be representative of one or more portions or components in support of a secure address translation service that implements one or more techniques described herein.

As used in this application, the terms "system" and "component" and "module" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive or solid state drive (SSD), multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 includes one or more processors 602 and one or more graphics processors 608, and may be a single processor desktop system, a multiprocessor workstation system, or a server system having a large number of processors 602 or processor cores 607. In on embodiment, the system 600 is a processing platform incorporated within a system-on-a-chip (SoC or SOC) integrated circuit for use in mobile, handheld, or embedded devices.

An embodiment of system 600 can include, or be incorporated within, a server-based gaming platform, a game console, including a game and media console, a mobile gaming console, a handheld game console, or an online game console. In some embodiments system 600 is a mobile phone, smart phone, tablet computing device or mobile Internet device. Data processing system 600 can also include, couple with, or be integrated within a wearable device, such as a smart watch wearable device, smart eyewear device, augmented reality device, or virtual reality device. In some embodiments, data processing system 600 is a television or set top box device having one or more processors 602 and a graphical interface generated by one or more graphics processors 608.

In some embodiments, the one or more processors 602 each include one or more processor cores 607 to process instructions which, when executed, perform operations for system and user software. In some embodiments, each of the one or more processor cores 607 is configured to process a specific instruction set 614. In some embodiments, instruction set 609 may facilitate Complex Instruction Set Computing (CISC), Reduced Instruction Set Computing (RISC), or computing via a Very Long Instruction Word (VLIW). Multiple processor cores 607 may each process a different instruction set 609, which may include instructions to facilitate the emulation of other instruction sets. Processor core 607 may also include other processing devices, such a Digital Signal Processor (DSP).

In some embodiments, the processor 602 includes cache memory 604. Depending on the architecture, the processor 602 can have a single internal cache or multiple levels of internal cache. In some embodiments, the cache memory is shared among various components of the processor 602. In some embodiments, the processor 602 also uses an external cache (e.g., a Level-3 (L3) cache or Last Level Cache (LLC)) (not shown), which may be shared among processor cores 607 using known cache coherency techniques. A register file 606 is additionally included in processor 602 which may include different types of registers for storing different types of data (e.g., integer registers, floating point registers, status registers, and an instruction pointer register). Some registers may be general-purpose registers, while other registers may be specific to the design of the processor 602.

In some embodiments, one or more processor(s) 602 are coupled with one or more interface bus(es) 610 to transmit communication signals such as address, data, or control signals between processor 602 and other components in the system. The interface bus 610, in one embodiment, can be a processor bus, such as a version of the Direct Media Interface (DMI) bus. However, processor buses are not limited to the DMI bus, and may include one or more Peripheral Component Interconnect buses (e.g., PCI, PCI Express), memory buses, or other types of interface buses. In one embodiment the processor(s) 602 include an integrated memory controller 616 and a platform controller hub 630. The memory controller 616 facilitates communication between a memory device and other components of the system 600, while the platform controller hub (PCH) 630 provides connections to I/O devices via a local I/O bus.

Memory device 620 can be a dynamic random-access memory (DRAM) device, a static random-access memory (SRAM) device, flash memory device, phase-change memory device, or some other memory device having suitable performance to serve as process memory. In one embodiment the memory device 620 can operate as system memory for the system 600, to store data 622 and instructions 621 for use when the one or more processors 602 execute an application or process. Memory controller hub 616 also couples with an optional external graphics processor 612, which may communicate with the one or more graphics processors 608 in processors 602 to perform graphics and media operations. In some embodiments a display device 611 can connect to the processor(s) 602. The display device 611 can be one or more of an internal display device, as in a mobile electronic device or a laptop device or an external display device attached via a display interface (e.g., DisplayPort, etc.). In one embodiment the display device 611 can be a head mounted display (HMD) such as a stereoscopic display device for use in virtual reality (VR) applications or augmented reality (AR) applications.

In some embodiments the platform controller hub 630 enables peripherals to connect to memory device 620 and processor 602 via a high-speed I/O bus. The I/O peripherals include, but are not limited to, an audio controller 646, a network controller 634, a firmware interface 628, a wireless transceiver 626, touch sensors 625, a data storage device 624 (e.g., hard disk drive, flash memory, etc.). The data storage device 624 can connect via a storage interface (e.g., SATA) or via a peripheral bus, such as a Peripheral Component Interconnect bus (e.g., PCI, PCI Express). The touch sensors 625 can include touch screen sensors, pressure sensors, or fingerprint sensors. The wireless transceiver 626 can be a Wi-Fi transceiver, a Bluetooth transceiver, or a mobile network transceiver such as a 3G, 4G, Long Term Evolution (LTE), or 5G transceiver. The firmware interface 628 enables communication with system firmware, and can be, for example, a unified extensible firmware interface (UEFI). The network controller 634 can enable a network connection to a wired network. In some embodiments, a high-performance network controller (not shown) couples with the interface bus 610. The audio controller 646, in one embodiment, is a multi-channel high definition audio controller. In one embodiment the system 600 includes an optional legacy I/O controller 640 for coupling legacy (e.g., Personal System 2 (PS/2)) devices to the system. The platform controller hub 630 can also connect to one or more Universal Serial Bus (USB) controllers 642 connect input devices, such as keyboard and mouse 643 combinations, a camera 644, or other USB input devices.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Example 1 is method comprising receiving, from a first processing node of a distributed processing cluster, an indication of an attestation result and supporting data for a second processing node of the distributed processing cluster; transmitting the indication of attestation result and supporting data for the second processing node of the distributed processing cluster to at least one additional processing node of the processing cluster; and in response to a determination that the indication of an attestation result for the second processing node of the distributed processing cluster indicated that the second processing node of the distributed processing device is secure, establishing a secure communication connection with the second processing node of the distributed processing cluster using the supporting data.

Example 2 includes the subject matter of Example 1, wherein the indication of an attestation result is a binary indicator which has a first value to represent a failed attestation result and a second value to indicate a passed attestation result.

Example 3 includes the subject matter of Examples 1-2, wherein the supporting data comprises a public cryptographic key for the second processing node.

Example 4 includes the subject matter of Examples 1-3, wherein the supporting data comprises a timestamp which indicates a time at which the indication of the attestation result was generated.

Example 5 includes the subject matter of Examples 1-4, further comprising in response to a determination that an indication of attestation result for the second processing node of the distributed processing cluster indicated that the second processing node of the distributed processing device is not secure, challenging the attestation result.

Example 6 includes the subject matter of Examples 1-5, further comprising at least one of blocking a communication connection with the second processing node of the distributed processing cluster; or removing the second processing node from the distributed processing cluster.

Example 7 includes the subject matter of Examples 1-6 wherein the first processing node performs operations comprising initiating, in the first processing node of a distributed processing cluster, an attestation process with a second processing node of the distributed processing cluster; receiving, in the first processing node of the distributed processing cluster, a first set of measurements from the second processing node of the distributed processing cluster; obtaining, in the first processing node of the distributed processing cluster, a certificate chain associated with the second processing node; verifying, in the first processing node of the distributed processing cluster, the first set of measurements to obtain an indication of the attestation results; and broadcasting the indication of the attestation results from the first processing node of the distributed processing cluster to a plurality of processing nodes in the processing cluster.

Example 8 is an apparatus, comprising a processor; and a computer readable memory comprising instructions which, when executed by the processor, cause the processor to receive, from a first processing node of a distributed processing cluster, an indication of an attestation result and supporting data for a second processing node of the distributed processing cluster; transmit the indication of attestation result and supporting data for the second processing node of the distributed processing cluster to at least one additional processing node of the processing cluster; and in response to a determination that the indication of an attestation result for the second processing node of the distributed processing cluster indicated that the second processing node of the distributed processing device is secure, establish a secure communication connection with the second processing node of the distributed processing cluster using the supporting data.

Example 9 includes the subject matter of Example 8, wherein the indication of an attestation result is a binary indicator which has a first value to represent a failed attestation result and a second value to indicate a passed attestation result.

Example 10 includes the subject matter of Examples 8-9, wherein the supporting data comprises a public cryptographic key for the second processing node.

Example 11 includes the subject matter of Examples 8-10, wherein the supporting data comprises a timestamp which indicates a time at which the indication of the attestation result was generated.

Example 12 includes the subject matter of Examples 8-11, further comprising, in response to a determination that an indication of attestation result for the second processing node of the distributed processing cluster indicated that the second processing node of the distributed processing device is not secure, challenging the attestation result.

Example 13 includes the subject matter of Examples 8-12, further comprising at least one of blocking a communication connection with the second processing node of the distributed processing cluster; or removing the second processing node from the distributed processing cluster.

Example 14 includes the subject matter of Examples 8-13, wherein the first processing node performs operations comprising initiating, in the first processing node of a distributed processing cluster, an attestation process with a second processing node of the distributed processing cluster; receiving, in the first processing node of the distributed processing cluster, a first set of measurements from the second processing node of the distributed processing cluster; obtaining, in the first processing node of the distributed processing cluster, a certificate chain associated with the second processing node; verifying, in the first processing node of the distributed processing cluster, the first set of measurements to obtain an indication of the attestation results; and broadcasting the indication of the attestation results from the first processing node of the distributed processing cluster to a plurality of processing nodes in the processing cluster.

Example 15 is one more computer-readable storage media comprising instructions stored thereon that, in response to being executed, cause a computing device to receive, from a first processing node of a distributed processing cluster, an indication of an attestation result and supporting data for a second processing node of the distributed processing cluster; transmit the indication of attestation result and supporting data for the second processing node of the distributed processing cluster to at least one additional processing node of the processing cluster; and in response to a determination that the indication of an attestation result for the second processing node of the distributed processing cluster indicated that the second processing node of the distributed processing device is secure, establish a secure communication connection with the second processing node of the distributed processing cluster using the supporting data.

Example 16 includes the subject matter of Examples 13-15, wherein the indication of an attestation result is a binary indicator which has a first value to represent a failed attestation result and a second value to indicate a passed attestation result.

Example 17 includes the subject matter of Examples 15-16, wherein the supporting data comprises a public cryptographic key for the second processing node.

Example 18 includes the subject matter of Examples 15-17, wherein the supporting data comprises a timestamp which indicates a time at which the indication of the attestation result was generated.

Example 19 includes the subject matter of Examples 15-18, further comprising instructions stored thereon that, in response to being executed, cause the computing device to in response to a determination that an indication of attestation result for the second processing node of the distributed processing cluster indicated that the second processing node of the distributed processing device is not secure, challenging the attestation result.

Example 20 includes the subject matter of Examples 15-19, further comprising instructions stored thereon that, in response to being executed, cause the computing device to perform at least one of blocking a communication connection with the second processing node of the distributed processing cluster; or removing the second processing node from the distributed processing cluster.

Example 21 includes the subject matter of Examples 15-20, wherein the first processing node performs operations comprising initiating, in the first processing node of a distributed processing cluster, an attestation process with a second processing node of the distributed processing cluster; receiving, in the first processing node of the distributed processing cluster, a first set of measurements from the second processing node of the distributed processing cluster; obtaining, in the first processing node of the distributed processing cluster, a certificate chain associated with the second processing node; verifying, in the first processing node of the distributed processing cluster, the first set of measurements to obtain an indication of the attestation results; and broadcasting the indication of the attestation results from the first processing node of the distributed processing cluster to a plurality of processing nodes in the processing cluster.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. A computer-implemented method comprising:
receiving an indicator associated with an attestation result and supporting data relating to a processing node of a cluster of processing nodes;
verifying the indicator and the supporting data to determine that the processing node is secure for communication, wherein the supporting data includes a public cryptographic key associated with the processing node and a timestamp revealing when the indicator was verified, and wherein the indicator includes a binary indicator relating to and representing the attestation result;
upon determining the processing node is secure for communication, securing a communication connection between the processing node and one or more processing nodes of the cluster based on the supporting data such that data movement via the secured communication connection is protected using encryption keys, wherein the processing node is removed from the cluster upon determining the processing node is not secure for communication; and
enabling peer-to-peer attestation and generating a blockchain-based decentralized protocol that is used as a medium to store and distribute attestation results to establish secure communication that is device-agnostic and used to establish trust and challenge previous attestation results.

2. The method of claim 1, wherein the indicator comprises a binary indicator having a first value to represent a failed attestation result or a second value to indicate a passed attestation result.

3. The method of claim 1, further comprising:
upon determining the processing node is not secure, challenging the attestation result, and blocking a communication connection between the processing node and the one or more processing nodes of the cluster, and removing the processing node from the cluster.

4. The method of claim 1, further comprising:
initiating an attestation process with the processing node of the cluster;
receiving a first set of measurements from the processing node;
obtaining a certificate chain associated with the processing node;
verifying the first set of measurements to obtain the indicator; and
broadcasting the indicator to the one or more processing nodes of the cluster.

5. An apparatus comprising:
processing circuitry coupled to a memory, the processing circuitry to:
receive an indicator associated with an attestation result and supporting data relating to a processing node of a cluster of processing nodes;
verify the indicator and the supporting data to determine that the processing node is secure for communication, wherein the supporting data includes a public cryptographic key associated with the processing node and a timestamp revealing when the indication was generated, and wherein the indicator includes a binary indicator relating to and representing the attestation result;
upon determining the processing node is secure for communication, secure a communication connection between the processing node and one or more processing nodes of the cluster based on the supporting data such that data movement via the secured communication connection is protected using encryption keys, wherein the processing node is removed from the cluster upon determining the processing node is not secure for communication; and
enable peer-to-peer attestation and generating a blockchain-based decentralized protocol that is used as a medium to store and distribute attestation results to establish secure communication that is device-agnostic and used to establish trust and challenge previous attestation results.

6. The apparatus of claim 5, wherein the indicator comprises a binary indicator having a first value to represent a failed attestation result or a second value to indicate a passed attestation result.

7. The apparatus of claim 5, wherein the processing circuitry is further to:
upon determining the processing node is not secure, challenge the attestation result, and block a communication connection between the processing node and the one or more processing nodes of the cluster, and remove the processing node from the cluster.

8. The apparatus of claim 5, wherein the processing circuitry is further to:
initiate an attestation process with the processing node of the cluster;
receive a first set of measurements from the processing node;
obtain a certificate chain associated with the processing node;
verify the first set of measurements to obtain the indicator; and
broadcast the indicator to the one or more processing nodes of the cluster.

9. A non-transitory computer-readable medium having stored thereon instructions which, when executed, cause a computing device to perform operations comprising:
receiving an indicator associated with an attestation result and supporting data relating to a processing node of a cluster of processing nodes;
verifying the indicator and the supporting data to determine that the processing node is secure for communication, wherein the supporting data includes a public cryptographic key associated with the processing node and a timestamp revealing when the indication was generated, and wherein the indicator includes a binary indicator relating to and representing the attestation result;
upon determining the processing node is secure for communication, securing a communication connection between the processing node and one or more processing nodes of the cluster based on the supporting data such that data movement via the secured communication connection is protected using encryption keys, wherein the processing node is removed from the cluster upon determining the processing node is not secure for communication; and
enable peer-to-peer attestation and generating a blockchain-based decentralized protocol that is used as a medium to store and distribute attestation results to establish secure communication that is device-agnostic and used to establish trust and challenge previous attestation results.

10. The non-transitory computer-readable medium of claim 9, wherein the indicator comprises a binary indicator having a first value to represent a failed attestation result or a second value to indicate a passed attestation result.

11. The non-transitory computer-readable medium of claim 9, wherein the operations further comprise:
upon determining the processing node is not secure, challenging the attestation result, and block a communication connection between the processing node and the one or more processing nodes of the cluster, and remove the processing node from the cluster.

12. The non-transitory computer-readable medium of claim 9, wherein the operations further comprise:
initiating an attestation process with the processing node of the cluster;
receiving a first set of measurements from the processing node;
obtaining a certificate chain associated with the processing node;
verifying the first set of measurements to obtain the indicator; and
broadcasting the indicator to the one or more processing nodes of the cluster.

* * * * *